June 23, 1970 D. E. BOEGEMAN 3,517,214

HIGH SPEED NARROW BAND SIGNAL RECOGNITION CIRCUIT

Original Filed Jan. 31, 1967

INVENTOR.
DWIGHT E. BOEGEMAN

BY Ervin F. Johnston

ATTORNEY.

United States Patent Office 3,517,214
Patented June 23, 1970

3,517,214
HIGH SPEED NARROW BAND SIGNAL RECOGNITION CIRCUIT

Dwight E. Boegeman, Lakeside, Calif., assignor, by mesne assignments, to the United States of America as represented by the Secretary of the Navy Continuation of application Ser. No. 613,049, Jan. 31, 1967. This application Mar. 7, 1969, Ser. No. 813,795
Int. Cl. H03k 5/20
U.S. Cl. 307—233 6 Claims

ABSTRACT OF THE DISCLOSURE

A mixed signal consisting of background noise and a recognition signal of known frequency first is divided and one part fed to one input of a differential amplifier. The other part is passed through a phase detector or comparator the output of which feeds into the other part of the comparator. The differential amplifier is arranged to provide an output only when there is a reduced or negligible output fed into it by the phase comparator. Also, the comparator output is responsive to the presence of the recognition signal frequency to the extent that its presence results in a negligible comparator output so as to produce a differential amplifier output which is the signal recognition output of the entire circuit. The comparator output is phase sensitive and, preferably, includes a transistor having both its emitter and base coupled to the mixed signal input. When the mixed signal is applied equally to the transistor, its equal amplitude and phase preclude transmission or conduction and cancel the comparator output so as to produce the differential amplifier output. The amplifier output, however, normally is presented by coupling an impedance circuit, such as a resonant circuit, into one terminal of the comparator, such as the emitter terminal, the impedance introducing a lead or lag and causing the transistor of the comparator to amplify the applied signal and produce the comparator output which, as stated, eliminates the output of the differential amplifier. Recognition is achieved by making the impedance self-cancelling in the presence of the known recognition signal frequency. Preferably the self-cancelling effect is achieved by employing a resonant circuit tuned to the known signal frequency as the impedance device. In this manner recognition can be accomplished very rapidly even for narrow band inputs since it depends upon phase matching which occurs early during the rise time of the tuned circuit rather than being delayed by thresholding requirements.

This application is a continuation of an application previously filed and identified as Ser. No. 613,049, Jan. 31, 1967, "High Speed Narrow Band Recognition Circuit," and now abandoned.

The present invention relates to recognition circuits preferably of the type used in navigation to trigger responders having known locations.

BACKGROUND OF THE INVENTION

As the science of oceanography directs more of its attention to the floor of the deep ocean, the need for an accurate system of relative position fixing is becoming a necessity. Deep submergence vehicles, manner and unmanned, and deeply towed instruments on very long wires cannot use conventional navigational systems, which of course do not have the required precision for many of these functions if they could be used. Navigational problems encountered in search and rescue operations are similar to those involved in making a detailed study of the sea floor, the success of either depending upon the ability to relate the exact position of the vehicle at all times to a fixed location on the sea floor. One solution to this problem is to construct a network of acoustic transponders on the ocean bottom and interrogate them from the vehicle while the data run or search operation is in progress. An instrument of this sort must be designed to satisfactorily cope with the numerous acoustic problems encountered in the ocean, have a good usable range, and survive for a reasonable length of time in the environmental conditions of the sea floor.

Of primary importance is its ability to distinguish an interrogation signal from the wide variety of noises present in the ocean. It must not respond to background noise or noise bursts but must reply even to very weak legitimate signals. Also, these transponders should be able to recognize short interrogation pulses of widely varying amplitude in the presence of a widely varying noise level.

Recognition circuits of many different types have been devised for a variety of purposes depending to some extent on the type of signals to be processed. For example, some circuits are designed for pulsed energy samples or, at least, samples in which the energy has become a pulse, while others, such as the present one, recognize samples that still have some wave content. Other factors involve the band width of the sample which, in turn, is concerned with the speed of the recognition and security. Thus, speed of recognition is far more of a problem in narrow band circuits particularly since prior art circuits for the most part have utilized threholding mechanisms as the recognition decision factor. Obviously, thresholding requires the sample to build at least a pre-set amount and, of course, the building is a limiting factor in speed. Another vital factor is reliability or, in other words, the ability of the circuit to eliminate interference of false signals. Some circuits, for example, eliminate most of these false signals and are considered adequate for their intended purposes. Others, such as the present, should eliminate substantially all such signals including noise bursts of unusually high energy. Still another consideration related to the others is the required duration of the interrogation signal since, here again, if time is needed for the signal to build, the sample must be proportionately long.

It is therefore an object of the present invention to provide a high speed, narrow band recognition circuit.

Another object is to provide a narrow band recognition circuit capable of recognizing extremely short interrogation signals and rejecting noise bursts.

A further object is to provide a narrow band recognition circuit which has a wide dynamic range in recognizing interrogation signals.

Still another object is to provide a high speed, narrow band recognition circuit which will operate with a poor signal-to-noise ratio.

Yet another object is to provide a simply constructed high speed, narrow band recognition circuit which will operate over a wide dynamic range.

Still a further object is to provide a method of quickly recognizing an interrogation signal mixed with noise in a relatively narrow band width.

These and other objects are achieved by employing a modified differential amplifier and a phase detector or comparator. In a manner to be explained, the comparator is responsive to the frequency of the recognition signal to produce a "go" and "no-go" signal which then is fed into the differential amplifier the output of which is dependent upon the generation of the "go" signal. In the preferred form, the comparator employs a tuned circuit which, in the absence of the recognition frequency, introduces an impedance which enables the comparator to transmit a "no-go" signal to the differential amplifier. Presence of the recognition signal produces resonances in the tuned circuit to reverse the impedance and produce a phase match resulting in a "go" output. One of the important consideration affecting the recognition speed is that the phase match can occur early during the rise time in the tuned circuit so that the production of the "go" signal, which is the decision factor, becomes equally rapid. Although the tuned circuit is preferred, it will be recognized that other known circuits, such as bridged-T arrangements, which function to impose a self-cancelling impedance, can be substituted.

The preferred embodiment of the invention is illustrated in the accompanying drawings of which:

Figure 1:
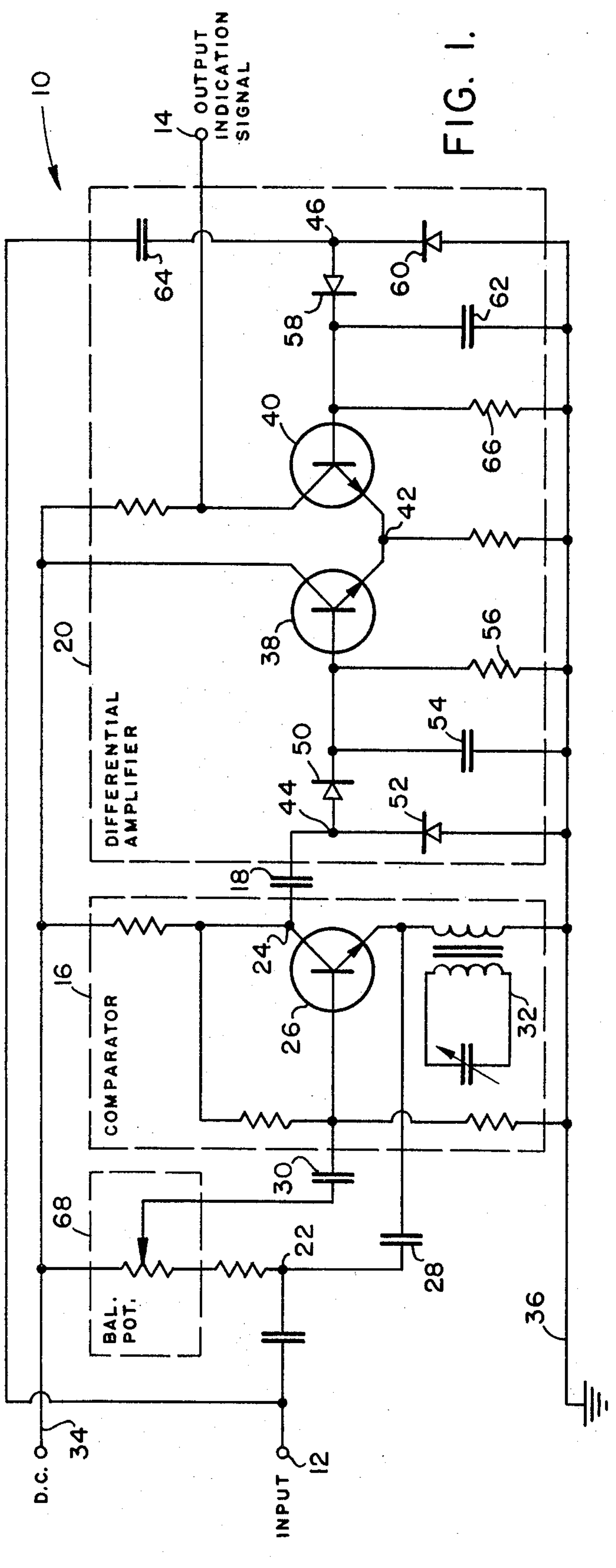
FIG. 1 is a circuit diagram.

FIG. 1 shows an exemplary high speed narrow band recognition circuit 10 which is adapted for receiving mixed incoming signals of both noise and interrogation at terminal 12 and producing an output indication signal at output terminal 14 when the recognition detects an interrogation signal. The recognition circuit 10 includes a comparator 16 coupled by any suitable means such as a capacitor 18 to a differential amplifier 20. Both the comparator 16 and the differential amplifier 20 receive the mixed signals of noise and interrogation and cooperate with one another to detect and rapidly indicate the receipt of an interrogation signal even though the recognition circuit is operating on a very narrow band for security reasons.

Considering these basic components in greater detail, comparator 16 has an input terminal 22 capacitively coupled to terminal 12 for receiving the mixed signals and also an output terminal 24 at which the recognition circuit is capable of producing either a "go" or a "no go" output which, in turn, is applied to one side of differential amplifier 20. An active element 26 which may be a tube or a solid state component, such as a transistor 26, is the critical decision-making element and, as illustrated, the mixed signal at input terminal 22 is coupled both to its emitter and its base, the coupling being provided in any suitable manner such as by capacitors 28 and 30.

Comparator 16 also includes a resonant circuit 32 formed of a variable capacitor and a coil, and the circuit 32 is inductively coupled to the emitter of the transistor 26 for the highly significant purpose of introducing an impedance except when the impedance is cancelled by resonance. The impedance is achieved by setting the variable capacitor of the resonant circuit to a frequency which corresponds to the interrogation signal to be received. In the absence of an interrogation signal the resonant circuit 32 is inactive, thus allowing the transistor 26 to amplify and produce the "no go" at output terminal 24.

Amplification results because the impedance produces a lead or lag to cause a phase distortion. As a result there is a phase difference between the signals applied to the emitter and the base which, in the usual manner, causes the transistor to amplify and apply the input to output terminal 24.

When the frequency of the interrogation signal is present in the mixed input, tuned circuit 32 becomes active to effectively minimize its impedance and remove the phase distortion. Consequently, since the same input signal is applied both to the transistor base and emitter, the input at the emitter then can quickly match the phase at the base. Obviously if the phase and amplitude of the base and emitter input are equal, the transistor does not conduct and no signal is produced at output 24. This condition of no output is, for descriptive purposes, termed the "go" signal since, as will be explained, it is this condition that causes differential amplifier to conduct to produce the decision signal at its output 14. The phase match is achieved in the manner already stated. To assure an amplitude match a balanced potentiometer 68 controls the amplitude of the signal applied to the base of the transistor. As may be noted in FIG. 1, the comparator as well as the differential amplifier derive their power from DC power lines 34 and 36.

Differential amplifier 20 includes a pair of active elements such as transistors 38 and 40. The emitters of the pair of transistors 38 and 40 are interconnected at 42 and the bases connected to respective input terminals 44 and 46. Its output terminal 24 is connected to input terminal 44 of transistor 38 by capacitor 18. Input terminal 46 of transistor 40 is coupled to input terminal 12 of the recognition circuit by any suitable means, such as a capacitor 64, so as to receive the mixed incoming signals of noise and/or interrogation.

Diodes 50 and 52, capacitors 54 and 18, and resistor 56 comprise an envelope detector which couples the output of the comparator at terminal 24 to the base of transistor 38. Diodes 58 and 60, capacitors 62 and 64, and resistor 66 comprise another envelope detector which couples the signal from input terminal 12 to the base of the transistor 40. As already indicated, transistors 38 and 40 may be powered by connecting them across DC power lines 34 and 36.

The collector of the transistor 40 is connected to the recognition circuit output terminal 14 where an output indication signal will be produced when an incoming interrogation signal is received at the input recognition circuit terminal 12. This operation is caused by the unique cooperation between comparator 16 and the differential amplifier 20.

The ability of the differential amplifier to produce either the "go" or "no go" output is determined by relative levels of the signals received by transistors 38 and 40. As stated, the signal at transistor 38 is received from comparator 16 while the signal of transistor 40 is received from input terminal 12. When transistor 26 of comparator 16 is conducting it is, as stated, amplifying so as to produce a signal at transistor 38 of the different amplifier that is higher than that of transistor 40. The degree of amplification, of course, varies with circuit components which, preferably, are selected to provide a consistently higher level as may be noted by the levels **38*a* and 40*a* shown in FIG. 3. This condition, as will be recalled, is dependent upon the production of the "no go" signal by the comparator, and in this condition the higher level of transistor 38 level holds the other transistor 40 in a non-conductive state so that there is no output at terminal 14**.

Figure 4:
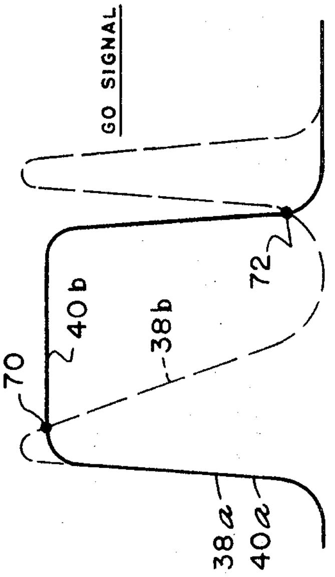
FIG. 4 is a graph showing the different levels of the two sides of the differential amplifier upon receipt of an interrogation signal.

Upon the receipt of an interrogation signal at input terminal 12 the transistor 26 of the comparator 16 has a drastically theoretically-cancelled output which, as presently defined, produces the "go" indication of output terminal 24. The go indication from comparator 16 causes the signal level **38*a* (FIG. 3) of transistor 38 of the differential amplifier to drop sharply and cross the signal level 40 of the other transistor. When the levels cross, transistor 40 then can conduct and produce an output indication signal at the output terminal 14. This relationship is illustrated in FIG. 4 wherein the level 38*b* represents the signal received by transistor 38 and level 40*b* represents the signal received by transistor 40. As long as the height of 38*b* is below the height of 40*b* the transistor 40 will be conductive and an output indication signal will be produced. Accordingly, the output indication signal will be commenced at the crossing 70 of the envelopes and terminated at the crossing 72** of the envelopes, as shown in FIG. 4.

The unusually high speed of the recognition circuit 10 in detecting an interrogation signal is due to the minute amount of time required for **38*b* to drop from its highest level to the first crossing with the 40*b* at point 70. More precisely, the crossing point is determined by the time which it takes for phase to match at the base and emitter of the comparator's transistor which crossing occurs at some point during the rise time of the resonant frequency. Under such an arrangement the present recognition circuit operates at a very early time on the rise time curve for the resonant circuit. Other recognition circuits operate at a later point on the rise time curves of their components. This is accomplished in the present recognition circuit by the differential operation of the amplifier 20 wherein the levels of the signal of the transistors 38 and 40 intersect to render the transistor 40 conductive. This unique relationship results in an extremely high speed even though the recognition circuit 10** operates on a very narrow band for security purposes.

Figure 3:
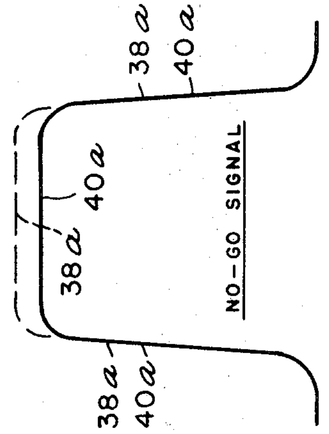
FIG. 3 is a graph showing the different levels of operation of the two sides of the differential amplifier of the present invention in the absence of an interrogation signal.

In the operation of the recognition circuit 10 comparator 16 receives mixed incoming signals of noise and/or interrogation. When the interrogation signal is absent the transistor 26 of the comparator 16 is amplifying so as to produce a no-go signal thereby holding the transistor 38 of the differential amplifier at a slightly higher level than the level of the transistor 40, as shown in FIG. 3. In this state there is an absence of any output indication signal at terminal 14. In contrast, however, when the comparator receives an interrogation signal the resonant circuit 32 operates at its resonant frequency to decrease the amplification of transistor 26 thereby producing a go signal to transistor 38 of the differential amplifier. This state causes the level of the transistor 38 to quickly drop and intersect the signal level of the transistor 40 thereby rendering the transistor 40 conductive to produce an output indication signal at terminal 14.

Figure 2:
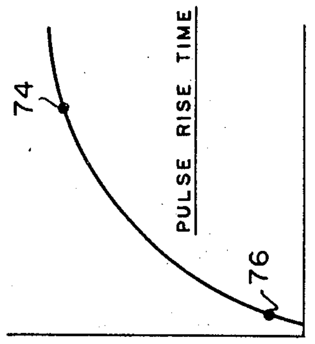
FIG. 2 is a graph showing a rise time curve.

The unusually high speed of the present recognition circuit may be illustrated by reference to FIG. 2 which shows a rise time curve. While the active elements of prior art recognition circuits operate at a later time on the rise time curve such as at point 74, the present invention is capable of operating at a much earlier time such as at point 76 on the rise time curve. Conceivably, the present invention may even operate at a lower point on the rise time curve than that shown. In one embodiment of the invention I have been able to obtain a response time of ½ millisecond with an effective band width of 200 cycles. The dynamic range of this embodiment was better than 65 db.

Aside from the ability of the present circuit to respond rapidly, it will be recognized that the arrangement provides unusual reliability and security particularly since it utilizes phase sensitivity in a narrow band input rather than the more familiar thresholding techniques. The band width, as would be surmised, is a measure of the Q of the resonant circuit. Consequently, false recognitions due to sudden high energy bursts of noise essentially are avoided. Further, an excellent signal to noise ratio is obtained. As also will be appreciated, the present circuit can and, in fact, is intended for use as in conjunction with a relatively wide band receiver so that advantage can be taken of the economic and rapid response time achievable with these receivers. The output of the circuit may be processed in any manner, although when used for the navigation purposes of the present invention, it will be applied to transponders placed strategically in known geographical location relative to an ocean floor.

Obviously many modifications and variations of the present invention are possible in the light of the above teachings. It is therefore to be understood that within the scope of the appended claims the invention may be practiced otherwise than as specifically described.

I claim:

1. Narrow band signal recognition apparatus for detecting and responding to interrogation signals of a particular predetermined frequency contained in a signal source of mixed frequencies, said apparatus comprising:
- a phase detecting comparator having an input coupled to said source and an output,
- a differential amplifier having an input coupled to said comparator output and an output, and

- power supply means for said comparator and amplifier,
- said comparator including:
  - a normally electrically-conductive amplifying component electrically coupled between the input and output of said comparator,
  - said component having first and second signal-conducting control terminals being adapted to restrict conduction through the component when the signals at both terminals are of the same amplitude and phase,
  - electrically conductive circuits coupling the comparator input to both of said control terminals for applying a portion of said signal source to both terminals,
  - means for equating the signal amplitude levels of the portions applied to the control terminals, and
  - phase-controlling impedance means electrically coupled into the conductive circuit of one of said terminals, said impedance means responding to the presence of said particular interrogation signal frequency by effectively removing its impedance from said conductive circuit whereupon the portion of the signal source applied to said one terminal becomes unimpeded to permit the phase of said portion to match the phase of the portion of the signal source applied to the other control terminal for effectively reducing the output of said comparator into said differential amplifier,
  - said differential amplifier being adapted for producing a differentially-amplified output signal only when the conduction of said comparator is effectively reduced.
  - whereby said apparatus detects and responds only when the signal source includes the particular frequency of said interrogation signal.

2. The apparatus of claim 1 characterized by the fact that, when the input of the comparator does not include the interrogation signal, the comparator is adapted to produce a signal output of a higher level than its signal input, the output level of the comparator rapidly dropping below the level of its input when said impedance means respond to said interrogation signal frequency.

3. The apparatus of claim 2 wherein said impedance means is a resonant circuit tuned to the frequency of said interrogation signals.

4. The apparatus of claim 3 wherein said electrically-conducting amplifying component is a transistor and said first and second control terminals are the base and emitter of the transistor.

5. The apparatus of claim 2 wherein said differential amplifier includes a pair of electrically-conductive components coupled one to said comparator output and the other to said signal source.

6. The apparatus of claim 5 wherein:
- said impedance means is a resonant circuit tuned to the frequency of said interrogation signal, and
- said electrically-conductive components of said differential amplifier each are transistors having their emitters electrically coupled one to the other and their bases electrically coupled one to the comparator output and the other to the signal input of the apparatus.

References Cited

UNITED STATES PATENTS

| | | | |
|---|---|---|---|
| 2,844,720 | 7/1958 | Gilbert | 328—141 |
| 3,281,722 | 10/1966 | Hellwarth | 307—233 |

JOHN S. HEYMAN, Primary Examiner

J. ZAZWORSKY, Assistant Examiner

U.S. Cl. X.R.

307—232; 328—139, 140